United States Patent [19]

Gross et al.

[11] Patent Number: 4,711,623
[45] Date of Patent: Dec. 8, 1987

[54] ANNULAR EXTRUSION DIE WITH INTERNAL CHOKE RING AND SPIDER MANDREL

[75] Inventors: Jonathan Gross, Canandaigua; O. James Marten, Stanley, both of N.Y.

[73] Assignee: Mobil Oil Corporation, New York, N.Y.

[21] Appl. No.: 862,729

[22] Filed: May 13, 1986

[51] Int. Cl.$^4$ ............................................. B29C 47/20
[52] U.S. Cl. ................................. 425/376 A; 425/467
[58] Field of Search ............... 425/466, 467, 113, 145, 425/208, 190, 191, 376 R, 376 A, 380; 364/209.3, 209.4, 176.1; 138/40, 46

[56] References Cited

U.S. PATENT DOCUMENTS

| 670,611 | 3/1901 | Hoffmann | 425/466 X |
| 1,182,199 | 4/1916 | Norris | 425/191 |
| 1,768,671 | 7/1930 | Devine | 425/467 |
| 2,987,766 | 6/1961 | Porter | 425/467 |
| 3,024,494 | 3/1962 | Szpila | 425/466 X |
| 3,583,033 | 6/1971 | Christofas et al. | 425/191 |
| 3,899,276 | 8/1975 | Sokolow | 425/380 |
| 3,932,090 | 1/1976 | Brumlik | 425/466 X |
| 3,976,419 | 8/1976 | Egli et al. | 425/467 |
| 4,045,154 | 8/1977 | Ratheiser | 425/467 |
| 4,283,168 | 8/1981 | Miller et al. | 425/466 X |
| 4,313,327 | 2/1982 | O'Connor | 425/466 X |
| 4,372,739 | 2/1983 | Vetter et al. | 425/466 |
| 4,382,766 | 5/1983 | Feuerherm | 425/466 X |
| 4,472,129 | 9/1984 | Siard | 425/467 X |
| 4,484,877 | 11/1984 | Stucke et al. | 425/113 |

Primary Examiner—Richard L. Chiesa
Attorney, Agent, or Firm—Alexander J. McKillop; Michael G. Gilman; Charles J. Speciale

[57] ABSTRACT

An annular extrusion die for extruding tubular thermoplastic materials, such as foamed thermoplastic, which incorporates an internal spider mandrel and a novel choke ring for eliminating striations in the extruded thermoplastic material while imparting an improved control over the uniformity in the gauge or thickness of the extruded plastic material. In order to more accurately control the uniformity in the gauge of the extruded plastic material, rather than varying the width of the gap or restriction in the die flow passageway formed by the choke ring which, in response to even minor changes in the gap width considerably changes the flow quantity, may overcompensate or overcontrol variations in the gauge thickness; there is varied the length of the land of the choke ring in the direction of material flow, in effect, in the machine direction, downstream of the spiders supporting the internal mandrel.

8 Claims, 6 Drawing Figures

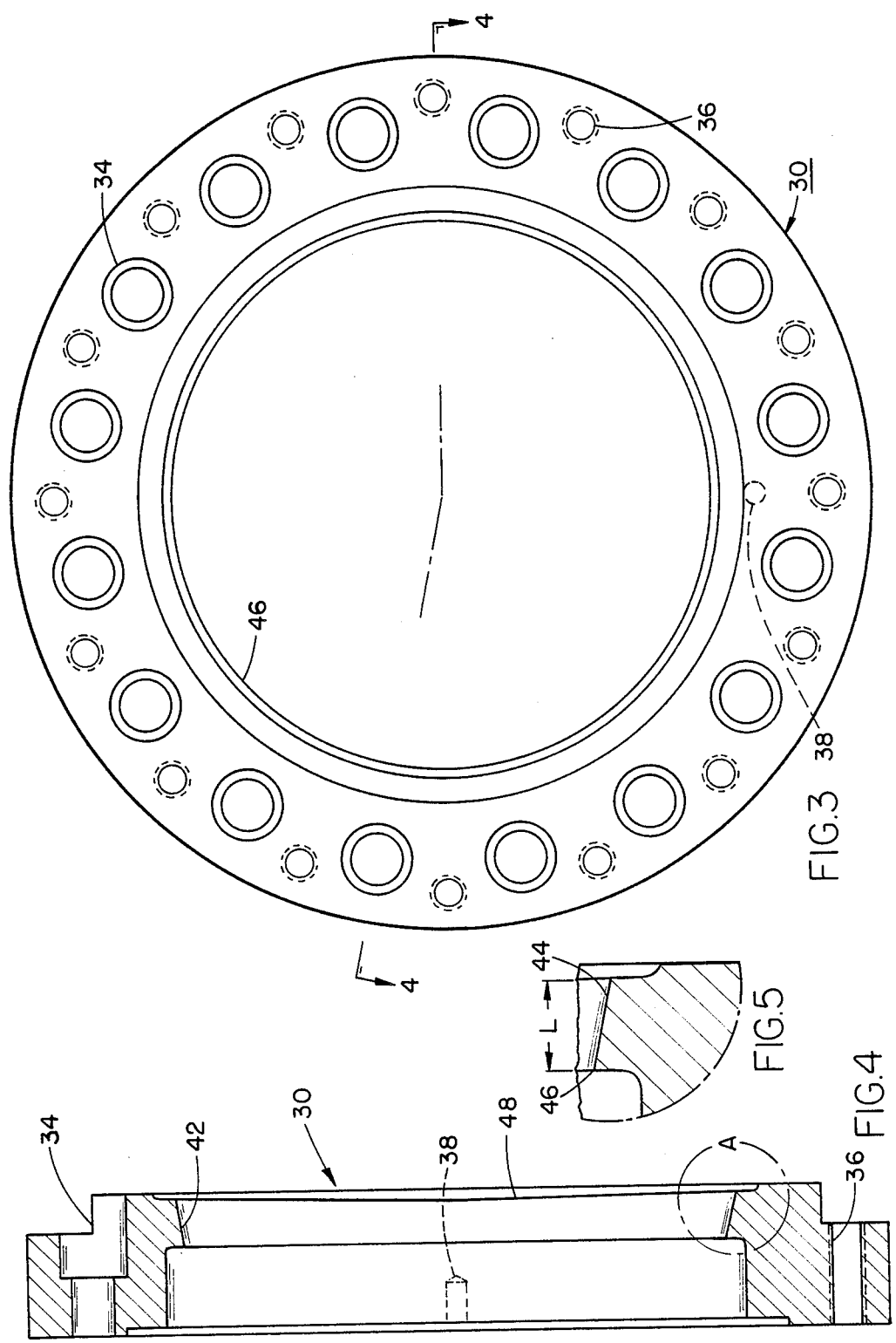

ANNULAR EXTRUSION DIE WITH INTERNAL CHOKE RING AND SPIDER MANDREL

BACKGROUND OF THE INVENTION

1. Field of the Invention

The present invention relates to an annular extrusion die for extruding tubular thermoplastic materials, such as foamed thermoplastic, and more particularly, relates to an annular extrusion die incorporating an internal spider mandrel and a novel choke ring for eliminating striations in the extruded thermoplastic material while imparting an improved control over the uniformity in the gauge or thickness of the extruded plastic material.

Although the technology of extruding tubular thermoplastic materials, such as foamed plastics which are subsequently employed in sheet form for the thermoforming of various articles; for example, plastic trays, cups, egg cartons or the like, is presently well developed and advanced, various problems are still in evidence in the extrusion of foamed plastics possessing a satisfactorily constant gauge thickness across its expanse and, moreover, which is devoid of weld lines or striations produced by the spiders supporting the internal mandrel of the annular extrusion die. Within the annular extrusion die, the flow of the thermoplastic material melt or polymer from the extruder to the extrusion die nozzle or orifice is subjected to separations in regions of the flow passageway radially traversed by spiders or webs through which an internal mandrel is supported within the body of the extrusion die, and with the separate flows of the melt then rejoining within the flow passageway downstream of the spiders supporting the mandrel. Generally, as the separated flows of the thermoplastic melt rejoin, at the junctures of the flows there are produced weld lines or striations which, subsequent to the extrusion of the tubular thermoplastic material, especially when formed into foamed plastic sheeting, represent weakening lines in the thermoplastic material tending to adversely affect the physical strength and flexibility of any articles subsequently thermoformed therefrom.

In other annular extrusion dies, in lieu of the spiders supporting the internal mandrels within the die body so as to form the flow passageway for the thermoplastic melt, a ring-shaped support plate extends across the flow passageway, with a plurality of through apertures being formed in the plate to permit the flow therethrough of the plastic material in the shape of numerous individual strands which then rejoin within the annular extrusion die flow passageway downstream of the plate to form a single material stream. However, the use of such an apertured or perforated plate causes the formation of a large number of weld lines or striations within the material, generally commensurate with the number of plate apertures, which may be unacceptable in the production therefrom of the thermoformed articles. The use of spiders for supporting the internal die mandrel considerably reduces the number of weld lines or striations in the extruded thermoplastic material, but still causes some but still weld lines or striations to be produced in the extruded material in regions where the flows of the melt regions in the extrusion die downstream of the spiders.

In order to alleviate the problems encountered in the formation of striations or weld lines in the thermoplastic material which is caused by the flow separations occasioned by the spiders of the internal die mandrel, annular flow restrictors or choke rings have been positioned so as to extend into the flow passageway of the extrusion die downstream of the spiders structure, providing a narrowed gap in the flow passageway and generating a back pressure upstream of the narrowing forcing the flows of material to more intimately admix upon rejoining so as to extensively obturate or eliminate any weld lines or striations produced in the material by the spiders. Generally, this has been accomplished in the technology by regulating the size or width of the annular gap formed by the restrictor or choke ring in the flow passageway of the extrusion die. Notwithstanding the alleviation of the various technological problems caused by striations through the use of restrictors or choke rings, these have not proven completely satisfactory in providing an accurate control over gauge thickness of the entire surface of extruded foamed thermoplastic material.

Although as mentioned hereinabove, the insertion of a choke ring to produce a predetermined annular flow restriction and generating back pressure to obturate striations in the thermoplastic materials, has alleviated many of the problems encountered with respect to the physical proper ties and strength of the extruded foamed thermoplastic, difficulties have been encountered in accurately controlling the gauge of the extruded material within requisite bounds. This is caused by the mathematical relationship between the flow rate of the plastic material changing to the third magnitude (cubed) with regards to changes in the width of the gap between the choke ring and the facing wall of the flow passageway. Thereby, even a slight change or variation in the gap width produces considerable changes in the quantity of material being extruded and in the resultant gauge thickness, and may lead to overcontrolling or "overshooting" any desired changes in the gauge thickness of the extruded plastic foam material.

2. Discussion of the Prior Art

Although extensive consideration has been devoted in the technology to the elimination or alleviation of striations in the thermoplastic foam extrudates caused by spider mandrels, there is a need to provide a more accurate control over the gauge thickness of the extruded material.

Sokolow U.S. Pat. No. 3,899,276 discloses an annular extrusion die with back pressure control over a polymer melt through the positioning of a restriction-forming choke ring in the flow passageway of the extrusion die downstream of a spider arrangement for an internal mandrel. The choke ring is adapted to restrict the cross-section by a predetermined extent to generate a controllable back pressure alleviating the formation of weld lines or striations in the extruded thermoplastic polymer melt. Pursuant to a modified embodiment, the choke ring rather than being mounted on the die body so as to extend radially inwardly in the annular flow passageway for the polymer melt, is mounted on the internal mandrel so as to extend radially outwardly to the passageway.

Devine U.S. Pat. No. 1,768,671 discloses a tubing machine incorporating an annular extrusion die having a spider mandrel supported within the body of the die through the intermediary of a plurality of radially extending webs, and includes an annular restrictor or choke ring downstream of the spider web in order to generate a back pressure tending to heal or obliterate weld lines or striations formed in the polymer extrudate.

Ratheiser U.S. Pat. No. 4,045,154 discloses an annular extrusion die for forming tubular foamed plastics, in which an internal spider mandrel is supported through the intermediary of a plurality of circumferentially spaced spider webs having aerodynamic cross-sections to enhance the rejoining of the separated flows of the polymer melt being conducted through the extrusion die, and in which grooves are formed in the facing surfaces of the mandrel and extrusion die body forming the annular passageway to obturate striations or weakening weld lines in the polymer material.

Norris U.S. Pat. No. 1,182,199 discloses a machine for molding tubular structures from plastic compounds, including an extrusion die having a mandrel supported therein by spiders, and with a flow restrictor producing a pressure build-up in order to compensate for weld lines or weakened sections in the tubular material caused by the presence of the spiders supporting the internal mandrel.

Porter U.S. Pat. No. 2,987,766 discloses a tubular extrusion die incorporating a flow restrictor imparting a change in width to the cross-section of an annular flow passageway for the plastic material so as to compensate for differences in the gauge of the extruded material.

Finally, Egli, et al. U.S. Pat. No. 3,976,419 discloses a annular extrusion die including the restrictor proximate the die orifice for improving the surface gloss and reducing the interior surface roughness of foamed thermoplastic materials.

Although each of the above-mentioned publications alleviate to some extent the problems encountered in the formation of weld lines or striations extruded tubular thermoplastic materials, such as foamed thermoplastics, which are produced by spiders supporting internal mandrels, the utilization of currently known choke rings is considered inadequate controlling the uniformity of the gauge of the extruded material by regulation of the back pressure about the circumference of the flow passage of the extrusion die through compensation of pressure differentials occasioned by the spiders of the spider mandrel of the die.

SUMMARY OF THE INVENTION

Accordingly, the present invention contemplates the provision of a novel and unique choke ring configuration which, while providing the desired back pressure and elimination of striations or weld lines in the polymer or thermoplastic melt, will also enhance the degree of accuracy in controlling the uniformity of the gauge or thickness of the extruded foamed thermoplastic material.

To this effect, the invention provides for a novel choke ring wherein, in order to more accurately control the uniformity in the gauge of the extruded plastic material, rather than varying the width of the gap or restriction in the die flow passageway formed by the choke ring which, in response to even minor changes in the gap width considerably changes the flow quantity, may overcompensate or overcontrol variations in the gauge thickness; by varying the length of the land of the choke ring in the direction of material flow, in effect, in the machine direction, downstream of the spiders supporting the internal mandrel. In order to effectuate the foregoing, and to regulate and compensate for differentials in the back pressure about the circumference of the flow passageway caused by the restriction of the choke ring so as to balance pressure reductions in the separate plastic material flows occasioned by the presence of the spiders, there is imparted a varying length in the machine direction to the land of the choke ring about the circumference thereof as a mathematical sinusoidal function, in effect, in a wavilinear cosine configuration. By appropriately arranging the choke ring and the peaks and valleys of the sinusoidal configuration of the land thereof relative to the circumferential location of the spiders, it is possible to continually regulate the back pressure acting on the thermoplastic material along each location in the annular gap formed between the choke ring and the facing extrusion die surface so as to cause the thermoplastic material to be also laterally displaced along the circumference of the flow passageway from regions of higher back pressure to those having lower back pressures which are produced by the spiders. This lateral flow of the material will provide a more accurate control over uniformity of the gauge or thickness of the extruded material inasmuch as the sinusoidal change in the length in the machine direction of the land of the choke ring produces a change in the flow rate of the thermoplastic as a linear mathematical function in contrast with variations in the gap width in the transverse direction of the flow.

Accordingly, it is a primary object of the present invention to provide an annular extrusion die for extruding tubular thermoplastic material, such as foamed thermoplastic, which incorporates a spider mandrel and a novel choke ring enabling an enchanced degree of control over the distribution of the thermoplastic material within the die flow passageway.

A more specific object of the present invention is to provide an annular extrusion die of the type described having a spider mandrel, and incorporating a novel choke ring design which will provide for a more uniform distribution of the thermoplastic material being extruded from the die so as to obliterate striations while concurrently producing an improved control over the uniformity of the gauge of the extruded thermoplastic material.

Still another object of the present invention is to provide an annular extrusion die of the type described, in which inventive choke ring has a variable land length in the machine direction of the flow of thermoplastic material in the configuration of a sinusoidal wave producing a cosine choke ring so as to regulate the back pressure within the die for a controlled distribution of material about the circumference of the annular flow passageway.

BRIEF DESCRIPTION OF THE DRAWINGS

The foregoing and other objects and advantages of the invention may be more readily ascertained from the following detailed description of an exemplary embodiment of the annular extrusion die with a spider mandrel and incorporating the novel cosine choke ring, taken in conjunction with the accompanying drawings; in which:

FIG. 3 illustrates an end view of the inventive cosine choke ring;

FIG. 4 illustrates a sectional view taken along line 4—4 in FIG. 3;

FIG. 5 illustrates, on an enlarged scale, a fragmentary view of the encircled portion A in FIG. 4.

DETAILED DESCRIPTION

Figure 1:
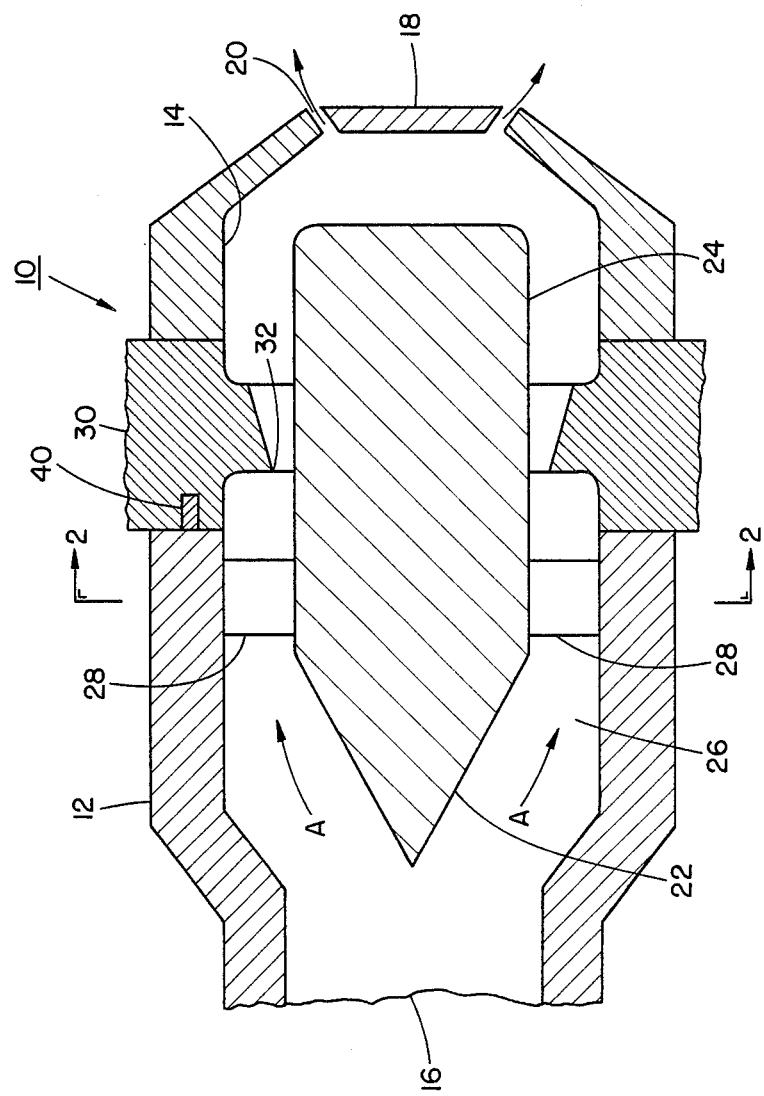
FIG. 1 schematically illustrates in a longitudinal sectional view, an annular extrusion die with an internal spider mandrel for extruding tubular foamed thermoplastic materials, and incorporating the inventive cosine choke ring.
Figure 2:
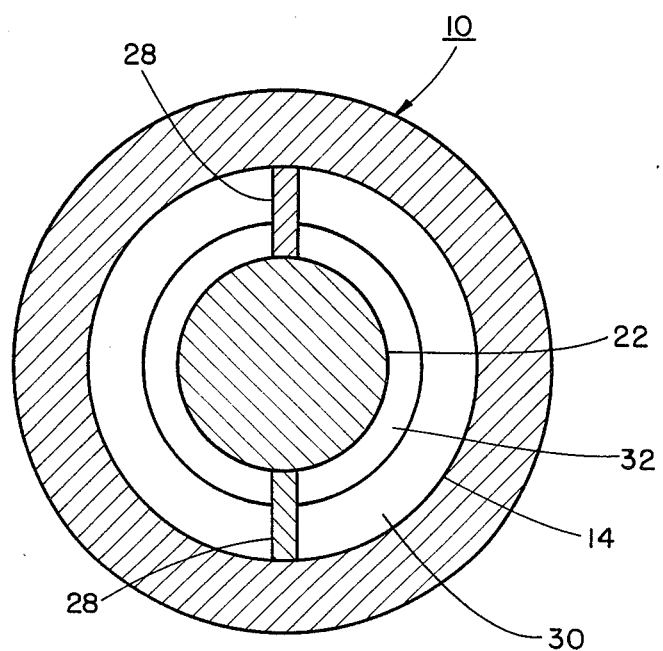
FIG. 2 illustrates a sectional view taken along line 2—2 in FIG. 1.

Referring now more specifically to FIGS. 1 and 2 of the drawings, there is illustrated a first embodiment of an annular extrusion die 10 which includes a die body 12 possessing a cylindrical cavity 14 which, at one end 16 thereof, communicates with a suitable extruder (not shown), such as, for example, a screw-type extruder for thermoplastic polymer melts and the like, as is well known in the art, and at its opposite end 18 extends into an extrusion die orifice or nozzle 20 for forming a tubular extruded product, such as a foamed thermoplastic tube adapted to slit to provide a layflat sheet for thermoforming plastic articles.

Arranged within the die body 12, and extending coaxially and concentrically therewith, is a spider mandrel 22 of generally known construction, having an outer generally cylindrical surface 24 so as to form an annular flow passageway 26 for the thermoplastic melt between the cylindrical surface 24 of the mandrel and the cylindrical wall surface of the cavity 14 of the die body 12.

The mandrel 22 is retained in fixed relationship with the die body 12 by means of a pair of diametrically oppositely located spiders or connector webs 28 which extend radially between the mandrel 22 and the die body 12 across the flow passageway, and which spiders may have any suitable cross-section, although they may be preferably configured as aerodynamic profiles so as to offer the least resistance to the oncoming flow of thermoplastic melt which separates into separate flows on each side of the spiders 28.

Arranged downstream in the flow direction of the thermoplastic material through the flow passageway as shown by arrows A, is the inventive cosine choke ring 30, which in this illustrated embodiment, is shown mounted in the die body 12, and which forms a flow restriction or narrow annular gap 32 in the annular flow passageway between the mandrel 22 and the die body 12 for the thermoplastic material.

According to the invention, the cosine choke ring 30, as illustrated in detail in FIGS. 3 through 5, has an outer peripheral flange portion 32 including a plurality of bolt holes 34 and threaded bores 36 so as to enable in-line attachment of the choke ring 30 to sections of the die body 12 on both sides thereof, as is well known in the technology and thus is not described in further detail hereinbelow. A small blind bore 38 may be provided at a specific location in one end surface of the choke ring 30 for alignment with an axially projecting dowel pin 40 on the upstream section of the die body 12 in order to ensure the correct rotational orientation and fastening of the cosine choke ring 30 relative to the radial location and orientation of the spiders 28.

Unlike currently utilized choke rings, in which the back pressure generated due to the gap or restriction in the flow passageway is dependent upon the width of the gap, and is not readily variable about the circumference of the passageway, pursuant to the present invention the back pressure about the circumference of the flow passageway is dependent upon the length of the land L extending in the material flow or machine direction on the inwardly protruding portion 42 of the choke ring 30 which forms the annular gap 32. The inner diametrical surface 44, as shown in detail in FIG. 5, presents an outwardly diverging taper or cone extending from the narrowest diameter 46 of the choke ring, with the width of the annular gap 32 of the flow passageway being between the diameter 46 and the outer cylindrical surface 24 of the spider mandrel 22. In order to impart a varying back pressure distribution about the circumference of the flow passageway along the land length "L" of the choke ring, this length changes pursuant to a sinusoidal mathematical function, as set forth in the following equation, assuming the basic land length "L" is "A" inches, and two spiders 28 are arranged 180° apart:

$$L = A - [B(\cos 2\theta)]$$

in which

L = height of the land parallel to the flow direction at a specific point about the circumference of the annular restriction relative to the circumferential location of the spider means, A = nominal basic height of land, B = a constant proportional to A calculated such that $0.05 < B/A < 0.20$;

resulting in a sinusoidal configuration being imparted to the circumferential surface 48 of the cosine choke ring 30. Thus, in essence, the length of the land "L" in the machine direction, as measured about the circumference of the flow passageway of the extrusion die, is essentially as set forth hereinabove, assuming that the mandrel 22 is supported within the die body 12 by means of two diametrically oppositely located spiders 28.

The highest point or greatest length "L" of the land of the cosine choke ring 30 in the machine direction, in this instance, is circumferentially offset 90° from the radial location of each spider 28, or, in effect, midway between the spiders, inasmuch as the greatest pressure exerted on the thermoplastic melt is encountered at those particular locations, whereas the lowest pressure is generally in axial alignment with each spider 28 downstream thereof, causing a lower flow rate of material to pass through the gap and with a resultant reduction in the gauge of the foamed material extruded at those locations. Consequently, the greater length of the land "L" at the locations which are circumferentially offset 90° from each spider 28, and the higher back pressure will cause a lateral flow of the thermoplastic melt towards the lower pressure regions of the land of the cosine choke ring, with the pressure distribution following a cosine or sinusoidal pattern commensurate with the length of the land, such that downstream of the cosine choke ring 30 the foamed thermoplastic material melt will be imparted a generally uniform flow rate about the entire circumference of the flow passageway leading to the extrusion nozzle 20, with an improved control over the constancy in the gauge or thickness of the extruded material, and with the concurrent obturation of any striations or weld lines produced in the material through the spiders 28.

Although the cosine $2\theta$ in the equation is directed to an internal spider mandrel possessing two diametrically oppositely located spiders 28, the equation in defining the sinusoidal configuration in the length "L" of the land of the cosine choke ring 30 may be readily modified so as to be adapted for the utilization of an internal spider mandrel with three or more circumferentially spaced spiders 28.

Figure 6:
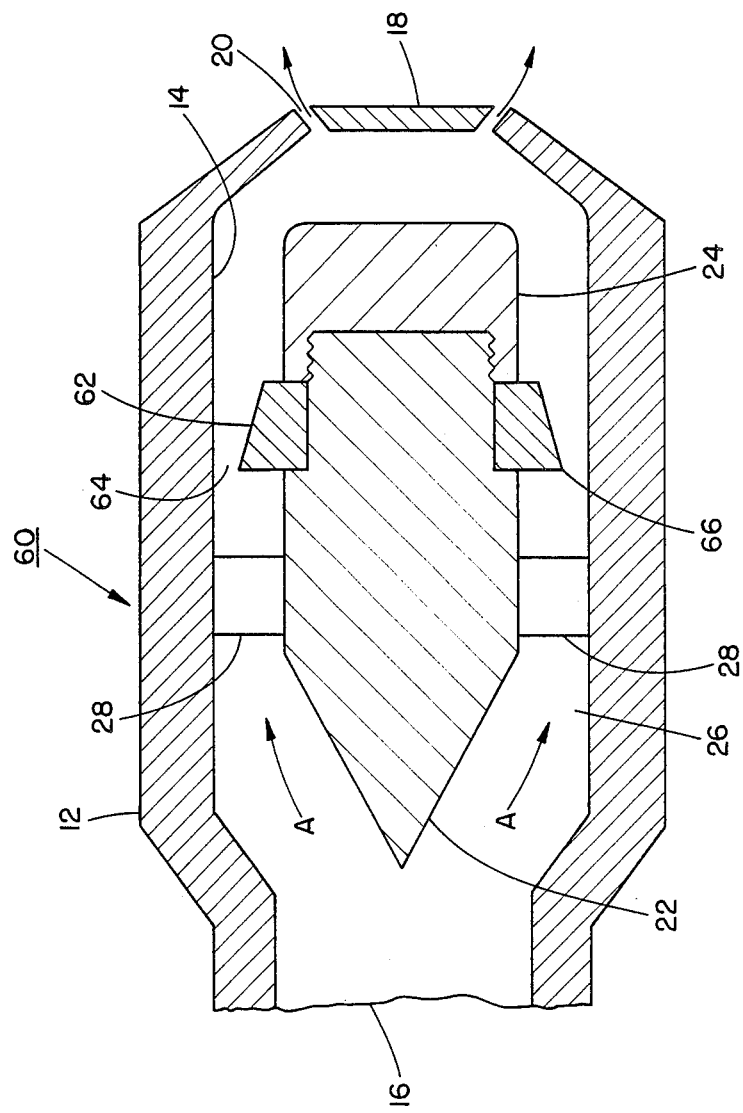
FIG. 6 schematically illustrates a longitudinal sectional view of another embodiment of the annular extrusion die with the inventive cosine choke ring being mounted on the spider mandrel.

Moreover, although the invention has been described with regard to the fastening of a cosine choke ring 30 to the external die body 12 so as to project radially inwardly into the annular flow passageway to form the flow restriction for the thermoplastic melt, it will be readily apparent to one skilled in the art that instead of the foregoing, pursuant to the embodiment of FIG. 6, the extrusion die 60 may have a cosine choke ring 62 mounted on the internal spider mandrel 22 so as to project radially outwardly into the annular flow passageway 26. In that instance, the annular gap 64 extends between the outermost diameter 66 of the cosine choke ring 62 and the inner wall 14 of the die body 12. This will eliminate the necessity for sealing elements to be positioned in the contacting surfaces of the die body sections and the choke ring 30 as in FIG. 1, since in this embodiment, the die body 12 may be a unitary, uninterrupted structure.

From the foregoing, it readily becomes apparent to one skilled in the art that the novel cosine choke ring 30 or 62 provides for improved flow characteristics and pressure regulation, and for a control over the flow rate of the foamed thermoplastic material, thereby providing a greater uniformity in the gauge of the extruded product, while concurrently obturating any weld lines or striations in the thermoplastic produced by the spiders supporting the spider mandrel.

While there has been shown and described what are considered to be preferred embodiments of the invention, it will of course be understood that various modifications and changes in form or detail could readily be made without departing from the spirit of the invention. It is therefore intended that the invention not be limited to the exact form and detail herein shown and described, nor to anything less than the whole of the invention herein disclosed any as hereinafter claimed.

What is claimed is:

1. An annular extrusion die for the extrusion of a thermoplastic material, such as foamed plastic and the like, comprising a die body having an elongated cylindrical cavity having one end communicating with a source of thermoplastic melt and with an extrusion die orifice for extruding tubular product at the opposite end thereof; an elongated cylindrical mandrel centrally arranged within said cavity and defining and elongate annular flow passageway therebetween; a plurality of circumferentially spaced said spider means extending radially across said flow passageway for fastening said mandrel to said die body; and a choke ring interposed in said annular flow passageway downstream of said spider means to form an annular restriction in the cross-section of said flow passageway and producing a back pressure on the thermoplastic material upstream of said restriction, said choke ring having a land extending in the flow direction of said passageway, said land having a height extending parallel to said flow direction of said passageway and said land continually varying in height about the circumference thereof so as to impart a predetermined varying back pressure distribution along the circumference of said restriction to the thermoplastic material conveyed through said restriction.

2. An annular extrusion die as claimed in claim 1, wherein the height of the land of said choke ring changes in a sinusoidal configuration about the circumference of said restriction.

3. An annular extrusion die as claimed in claim 2, wherein the height of the land about the circumference of said restriction changes in accordance with the equation $$L = A - [B (\cos 2 \theta)]$$

in which
- $L$ = [length] height of the land parallel to said flow direction at a specific point about the circumference of said annular restriction relative to the circumferential location of the spider means,
- $A$ = nominal basic height of the land,
- $B$ = a constant proportional to A, calculated such that $0.05 < B/A < 0.20$.

4. An annular extrusion die as claimed in claim 3, wherein the greatest height of the land of said choke ring is circumferentially located intermediate the circumferential location of each of said spiders, and the minimum height of said land is in alignment with each of said spider means.

5. An annular extrusion die as claimed in claim 1, wherein each of said spider means has an aerodynamic cross-section in the direction of material flow through said annular flow passageway.

6. An annular extrusion die as claimed in claim 1, wherein said cosine choke ring is mounted on said die body and includes an annular protuberance extending radially inwardly into said flow passageway to form said annular restriction.

7. An annular extrusion die as claimed in claim 6, wherein said land is formed on said annular protuberance, said protuberance being configured to impart said varying height to said land in the flow direction of said thermoplastic material.

8. An annular extrusion die as claimed in claim 1, wherein said cosine choke ring is mounted on said internal mandrel and includes an annular protuberance extending radially outwardly into said flow passageway to form said annular restriction.

* * * * *